Patented Nov. 10, 1931

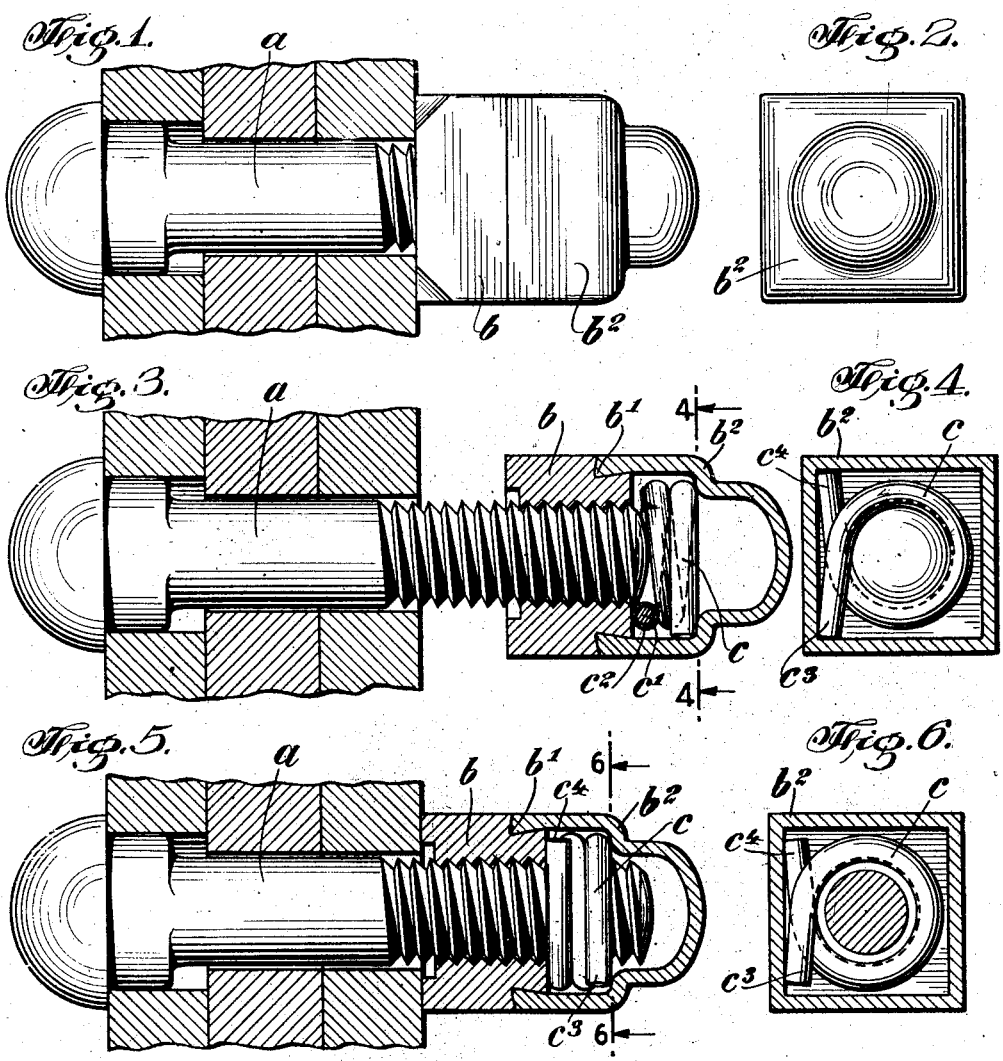

1,830,918

UNITED STATES PATENT OFFICE

AUGUST SUNDH, OF HASTINGS UPON HUDSON, NEW YORK

SELF-HOLDING NUT

Application filed March 17, 1928. Serial No. 262,381.

So called "self-locking" nuts have been proposed in many different forms with spring elements to lock or hold the nut. All of them have offered some objection rendering them unsuitable for general use. Among the outstanding objections may be noted excessive initial cost, difficulty of application to nuts of substantially standard form, unsuitability for reuse after the first application of the nut to a bolt, and undependability in service. The present invention has for its object to provide, in association with a nut of standard form, simple and inexpensive devices which shall be free from the objections just stated.

It sometimes happens in cutting threads on bolts that some irregularity develops, such as differences in diameter at different sections, usually the section at the end of the bolt being of smaller diameter than a section further inward. This sometimes results in the bolt offering less resistance at the end and more the further on it is threaded. Further difficulty arises when machines are taken apart and the various nuts confused, causing different nuts and bolts to be used together and a resulting variation in the relative holding abilities. A nut constructed in accordance with this invention will have a holding device which expands or contracts to accommodate variations of threads as noted above, without a noticeable difference in its holding effect.

In accordance with the invention, it is proposed to associate operatively with a nut of otherwise standard form, a spring element of such form and characteristics as to hold the nut normally against movement on the bolt to which it is applied and to engage the bolt with an added clamping force, whenever the nut is subjected to external forces tending to displace it. This principle, in accordance with the illustrated embodiments, may be most simply practiced by employing a coil spring which is operatively engaged with the nut and through which the bolt is forced upon threading of the nut on the bolt, the diameter of the coil, the stiffness of the spring and the number of convolutions all being so proportioned as to create for a bolt of given diameter a predetermined contractile force, whereby movement of the nut on the bolt is resisted frictionally up to but not beyond a desired degree. What may be termed the normal contractile force is augmented substantially whenever a force is applied to the nut tending to move it on the bolt, this condition being obtained by so associating the spring with the nut as to result in a coiling action of the spring on the bolt, when the nut is turned in one direction or another or, if so provided for, in either direction. By permitting a predetermined but limited relative displacement of the nut with respect to the coil, this coiling action may be accomplished to any predetermined desired degree, whereupon further movement will prevent any further increase of the holding force.

Another object of the invention is to provide in a self-holding device of the character indicated, a relatively soft metal gripping surface to protect the threads of the bolt, when the nut is screwed on, said soft metal being interposed operatively between the spring proper and the threads of the bolt.

In practice, the material encasing the spring and engaging the threads of the bolt is slightly softer than the material of the bolt threads, that is, sufficiently hard to prevent cutting threads in the spring, and at the same time not hard enough to damage the bolt threads.

The nut may be used on bolts with full or undersized threads without in any way lessening or impairing the full clamping capacity of the holding mechanism, because the spring is capable of expanding or contracting to hold the bolt, regardless of the accuracy of the threads formed thereon. Still another object of the invention is to provide in a device of the character described means for protecting the threads and the self-holding mechanism against direct mechanical injury when the nut is turned on the thread and also against foreign matter and weather, as through an enclosure carried directly with the nut and within which all operative parts are embodied.

Still another object of the invention is to provide in a holding device of the character described a spring which shall be of such construction and so related to the threads of the bolt and so supported that movement of the bolt through the coils of the spring progressively will not result in any of the coils adapting themselves to the threads and seating therein as in previous proposals. This relationship may be insured by embodying one or all of the following characteristics in the structure: the diameter or width of the cross section of the spring may be greater than the distance between threads on the bolts, the pitch of the spring coils may be different from the pitch of the threads on the bolt, the spring may be confined longitudinally in such manner that the coils are prevented from seating themselves in the threads, or the coils may be held at an angle to the threads so as not to conform thereto and wound closely together and held against separation. With such a relationship insured between the bolt and the holding spring it becomes of importance to provide the end coil of the spring along its inner circumference with an inclination so that the edges of the thread of the bolt may be guided with certainty into the coil when the bolt and nut are threaded together and without danger of axial displacement of the spring. The provision of such an inclination on the entering coil is particularly important where, as in the present invention, the coil is normally of less diameter than the bolt and adapted to be expanded by entry of the bolt thereinto to insure a contractive effort by the spring when the parts are assembled.

Other objects of the invention have to do with considerations of simplicity of design, whereby manufacture with minimum alteration of standard nuts is accomplished.

Reference is to be had to the accompanying drawings illustrating several embodiments of the improvements and in which Fig. 1 is a view partly in section and partly in elevation showing the improved nut as applied to a bolt of standard form now in use on fish plates of the New York Central lines.

Fig. 2 is an end view thereof.

Fig. 3 is a view similar to Figure 1, but showing the nut and associated parts in section and just before application of the nut to the bolt.

Fig. 4 is a cross-sectional view taken through the cap indicated on Figure 3 at line 4—4, looking in the direction of the arrows.

Fig. 5 is a view similar to Figure 3, but showing the nut fully applied to the bolt.

Fig. 6 is a view similar to Figure 4 and taken on line 6—6 at Figure 5 and looking in the direction of the arrows and indicating particularly the expansion of the coil when on the bolt with capacity for relative movement between the nut and the coil.

As will be clear as the description proceeds, the invention is not limited to the type of nut with which it is associated, nor to the type of bolt to which such a nut is to be applied. To emphasize the thoroughly practical nature of the improvements, however, there has been illustrated in the drawings a bolt $a$ which is of the type now in use by the New York Central lines and a nut $b$ which is of the type usually associated therewith, but modified in some slight and inexpensive respects for application of the invention thereto in a very advantageous way. In the embodiments shown in Figures 1–6, the nut illustrated is shown as having its outer end under cut peripherally, as indicated at $b'$ to permit the convenient application thereto of a cap $b^2$ to exclude foreign matter and the weather from the bolt, this cap being preferably placed directly onto the shoulder $b'$. With this slight and inexpensive modification of the nut $b$ no other changes from its standard form are required for incorporation of the improvements. In the cap $b^2$ is placed, before the cap is applied to the nut, a coil spring indicated generally at $c$ which, in the preferred form, includes a hardened spring element $c'$ which is encased in a relatively soft metal jacket $c^2$. The cap $b^2$ constitutes a casing to receive and hold the spring longitudinally and axially in proper operative relation to the nut and bolt and facilitate initial assembly with the coil axially disposed. The spring $c$ is so coiled as to have an inside diameter normally a little less than that of the bolt $a$ to which the nut is applied. The ends of the spring, which are indicated at $c^3$ $c^4$, are preferably opposed so as to create, with respect to the threaded bolt, the effect of leading and following coils. By making the cross-section of the spring cylindrical and expanding the end $c^4$ tangentially, it will be evident from Figure 3 that a curved, flaring surface is presented to the leading thread on the bolt $a$, when the nut is screwed onto the bolt so that the thread may engage the inner surface of the leading coil of the spring with a gradual but steadily increasing approach, such thread working its way along the inner curve of the spring until it reaches the smallest diameter of the coil. This relationship precludes the possibility of the threaded bolt exerting substantial pressure on the spring in other directions. Rotation of the nut on the bolt is accompanied by simultaneous rotation of the spring on the bolt, the spring being held against relative rotation with respect to the nut, while having capacity for very slight displacement with respect thereto at either one end or the other, or both.

In the form shown in Figures 1–6, the cap $b^2$ is square in cross section, so the ends $c^3$ $c^4$ of the coil spring engage the sides of the cap when the nut is rotated in one direction or the other, respectively. As shown in Figure 6, when the coil spring is forced onto the bolt so as to have its internal diameter increased, the ends $c^3$ $c^4$ of the coil spring are retracted with respect to the side walls of the cap $b^2$, thereby permitting even greater relative displacement momentarily between the spring ends and the cap.

The contractile force of the spring $c$, is of course, determined by all of the factors involved in the spring design and the force with which it engages the bolt $a$ depends further on the number of coils, their diameter and other factors in design. The resistance offered to threading of the nut onto the bolt and off the bolt may be made as great or as little as desired, within limits, the necessary condition which this invention contemplates being that when the nut is on the bolt, it will not move in either direction, but will be held by the spring. The force of the resistance offered by the spring to turning of the nut on the bolt is increased in accordance with the principle on which the invention rests by having the parts so related that whenever a force tends to turn the nut, the resistance offered by the holding mechanism will momentarily be a maximum. This additional resistance is secured by the tendency of the wire spring to coil more tightly around the bolt at the instant the nut begins to turn. This coiling continues until the force of the grip is released by slippage of the trailing end of the spring on the bolt. This condition is established whether or not the nut tends to turn in one direction or another and the actual resistance to turning can be predetermined in any particular design.

In each instance heretofore described it is contemplated that the spring wire proper shall be provided with a leading engaging surface which is of relatively softer metal than the threads of the bolt. When case-hardened iron or tempered steel bolts are used phosphor bronze wire springs may be suitable. For non-tempered steel, iron or brass bolts a softer material must be interposed between the springs and the threads of the bolts, whether or not the spring be of steel or phosphor bronze.

Since the improved holding device has the characteristic of holding the nut against accidental movement on the bolt by virtue of its contractive force, on the one hand, and yet permitting the nut to be applied to and removed from the bolt upon application of a predetermined turning effort it becomes an important consideration to so design the cooperating metal parts, in respect of their materials and strength as to insure ample holding capacity on the part of the spring without injury to the bolt threads and yet capacity as to the spring and nut for movement along the threads of the bolt when a predetermined force is applied to the nut for turning it on or off. This design further takes into account the relationship of the positive releasing devices employed for moving the spring along the threads upon application of the said predetermined maximum turning effort to the nut.

It will be seen that the nut cannot be loosened by vibration, since any reverse movement thereof causes a gripping of the spring. This enables the nut to be screwed on easily but requires a wrench for unscrewing. The structure and its operation are not affected by temperature or foreign matter and the life of the threads on both the bolt and nut is prolonged by reason of the protection afforded by the cap. As described previously, the nut is held with equal tenacity whether the threads are full or undersized but always to only a predetermined extent.

In the improved construction the holding force results from the frictional resistance created by the contractive power of the spring and is increased when the end of the spring is wrapped down further on the threads. The new and important provision in the present case is that if this wrapping down has progressed to a certain point it is positively stopped so that the holding force can be increased no further. This condition insures that a predetermined force applied to the nut will bring about its turning and that such predetermined turning force will be impressed on the spring throughout its length. This is doubly important if the metal has corroded and the binding action between the spring and threads has become unnaturally strong.

Changes in cross-sectional form and dimensional relationship of parts have been illustrated herein in order to emphasize the range of modifications that may be employed without departing from the spirit of the invention recited in the appended claims.

What I claim is:

1. A threaded nut, a threaded bolt for said nut, a holding device associated therewith comprising a coiled spring to grip the bolt thread by contraction when the nut and bolt are threaded together, and a liner between the spring and the threads of the bolt having softer surfaces than the bolt thread.

2. A threaded nut, a threaded bolt for said nut, a holding device associated therewith comprising a hardened coiled spring to grip the bolt thread by contraction when the nut and bolt are threaded together and a metal jacket encasing the spring and having a softer surface than the bolt thread.

3. A threaded nut, a threaded bolt for said nut, a holding device comprising a coiled spring arranged to grip the bolt with contractive frictional force, a cavity portion embodied in the nut and formed with two abutments therein one of said abutments being engageable by one free end of the spring after movement of the nut a predetermined distance to cause the nut to turn the spring in unison therewith when turned in one direction, the other abutment being normally spaced a predetermined distance from the other free end of the spring but engageable therewith after movement of the nut a predetermined distance in the reverse direction to cause the nut to turn the spring in unison therewith.

This specification signed this 16th day of March, A. D. 1928.

AUGUST SUNDH.